United States Patent [19]

Beynet et al.

[11] 4,290,715

[45] Sep. 22, 1981

[54] PIPELINE RISER FOR FLOATING PLATFORMS

[75] Inventors: Pierre A. Beynet, Tulsa, Okla.; Emil K. Williams, Gretna, La.

[73] Assignee: Standard Oil Company (Indiana), Chicago, Ill.

[21] Appl. No.: 45,717

[22] Filed: Jun. 5, 1979

[51] Int. Cl.³ .................. E02D 21/00; B23Q 1/08; F16L 1/00

[52] U.S. Cl. .................................................. 405/169

[58] Field of Search .............................. 405/168–171; 166/350, 359, 367

[56] References Cited

U.S. PATENT DOCUMENTS

| | | | |
|---|---|---|---|
| 3,214,921 | 11/1965 | Goepfert et al. | 405/168 |
| 3,454,083 | 7/1969 | Brooks | 166/337 |
| 3,530,680 | 9/1970 | Gardner | 405/169 |
| 3,612,177 | 10/1971 | Gassett et al. | 166/367 X |
| 3,698,199 | 10/1972 | Matthews | 166/359 X |
| 3,717,002 | 2/1973 | O'Brien et al. | 166/359 X |
| 3,724,061 | 4/1973 | Schipper | 405/169 X |
| 4,067,202 | 1/1978 | Reed | 166/359 X |

*Primary Examiner*—Dennis L. Taylor
*Attorney, Agent, or Firm*—John D. Gassett

[57] ABSTRACT

An unarticulated riser pipe for connecting a subsea pipeline to facilities on a floating platform. The riser pipe has a vertical section which is rigidly attached to a horizontal section which provides flexibility. Means are provided to maintain the tension on the vertical section. In one embodiment, a subsea frame aids in connecting the horizontal and vertical sections and then to set a limit on permitted motion of the riser pipe.

9 Claims, 7 Drawing Figures

PIPELINE RISER FOR FLOATING PLATFORMS

BRIEF SUMMARY OF THE INVENTION

The invention concerns a riser pipe which extends from a subsea line such as a seafloor pipeline to a floating vessel. The riser pipe is an unarticulated conduit having a substantially vertical section and a substantially horizontal section. The outer end of the horizontal section is attached to a seafloor pipeline or storage facility. The upper end of the vertical section of the conduit is supported by the floating vessel. No motion compensator devices between the riser and the vessel are required. After the riser pipe is installed, it is supported only at the upper end. Means are provided to apply a tension to the vertical section of the conduit. This can be in the form of a weight hung off the lower end of the vertical section or it can be a series of heavy collars supported on a flange at the lower end of the vertical section.

The conduit making up the riser pipe is not articulated, that is, it has no pivotal joints or ball joints. The substantially horizontal section provides a flexible section. Preferably, the horizontal section of the conduit includes at least three unsupported segments which are connected at right angles to each other to form approximately three sides of a square.

In a preferred embodiment, the horizontal section, arranged as just described, is supported within a subsea template. One end of the horizontal section is connected to a subsea pipeline and the other end is provided with an ell turned to a vertical position having an upwardly facing automatic connector. The end of the horizontal section with the connector is held downwardly against a fixed frame until after it is connected to the vertical section of the riser pipe. The fixed frame or support permits a downward force to be applied through the vertical section for connecting the lower end of the vertical section to the connector on the horizontal section. Once this connection is made, the horizontal section is released from the fixed support and, except for its attachment to the vertical section, hangs free. This system permits the riser pipe to be held in tension so as to prevent buckling caused by compression. It also provides the needed flexibility without having to use ball joints and/or telescopic joints.

DRAWINGS

A better understanding of the invention can be had in connection with the following description taken in conjunction with the drawings in which.

DETAILED DESCRIPTION

Figure 1:
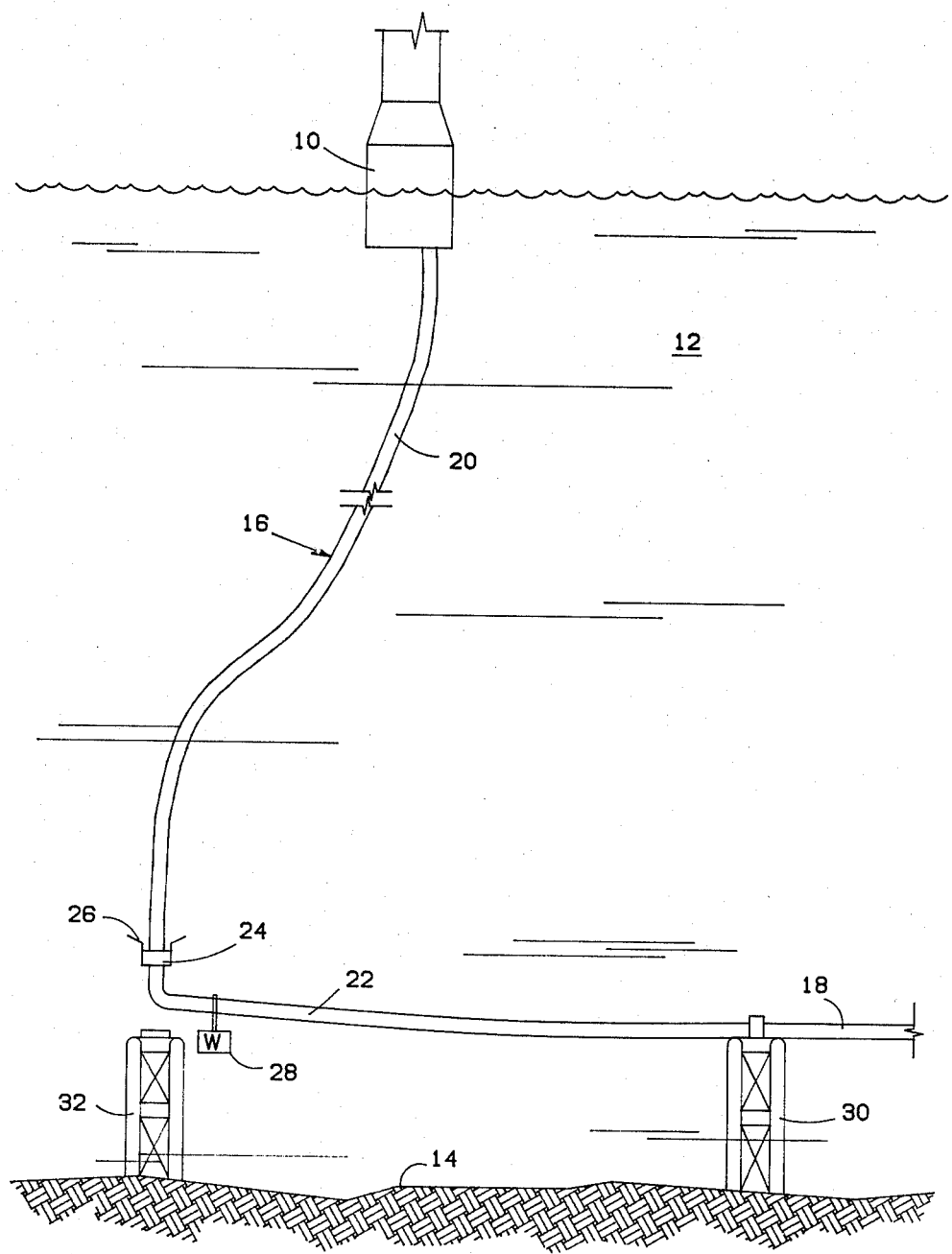
FIG. 1 illustrates schematically an installed riser pipe conduit having a weight suspended therefrom.

Attention is first directed to FIG. 1 which illustrates an apparatus of the invention in operation. Shown thereon is a floating vessel 10 supported by a body of water 12 above a bottom 14. A riser pipe conduit 16 connects a subsea pipeline 18 with the floating vessel 10. Riser pipe conduit 16 includes a vertical section 20 and a horizontal section 22. The horizontal section is connected to the vertical section 20 by connector 24 which can have guide funnel 26. Connector 24 can be any of the automatic connectors which are used for connecting two joints of pipes rigidly together. Alternatively, the sections 22 and 20 can be welded or otherwise rigidly connected. The depth of the water 12 can be anywhere from a few hundred feet up to 1000, 2000, or more feet. In this depth of water, it is important that the vertical section 20 be maintained in tension in order to increase lateral stiffness. Tension is applied to the apparatus of FIG. 1 by suspending a weight 28 at the lower end of the vertical section 20. Also shown in FIG. 1 is a first support frame 30 and a second support frame 32 which rests on the bottom 14. Frame 30 supports one end of subsea pipeline 18 which may be connected to a subsea well. The other support 32 is directly beneath the lower end of vertical section 20 and its use will be explained in the discussion of FIG. 3. The length of vertical section 20 and the weight of weight 28 is such that the lower end of vertical section 20 will at all times during normal operations be above support 32.

Figure 2:
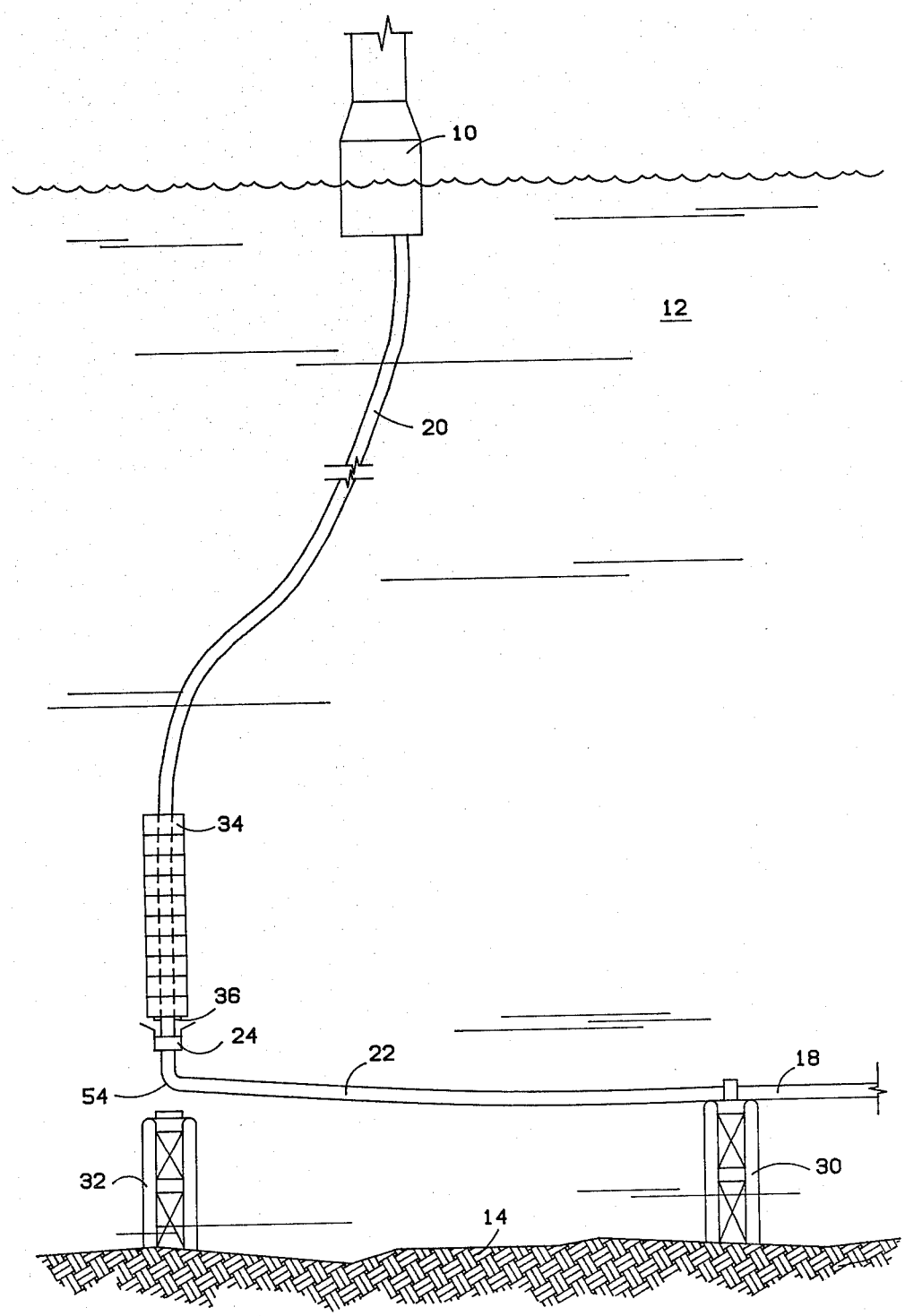
FIG. 2 is similar to FIG. 1 except that the means for applying tension to the vertical section of the riser pipe conduit is a series of collars supported at the lower end thereof.
Figure 4:
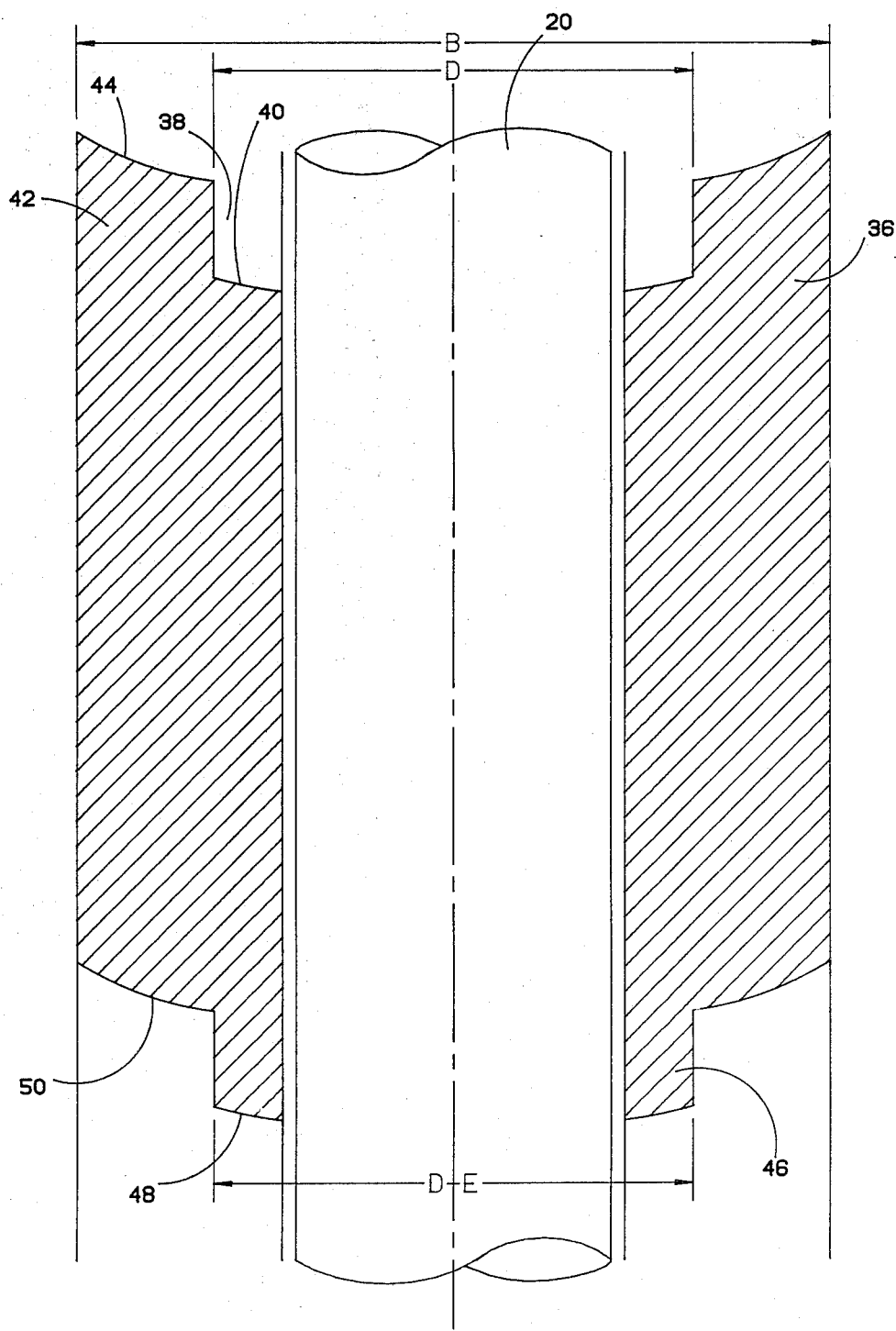
FIG. 4 illustrates a collar for adding weight to the lower end of the vertical section of the riser pipe conduit.

Attention is now directed to FIG. 2 which is very similar to the apparatus of FIG. 1 except in the manner in which the weight is applied to the lower end of vertical section 20. A series of collars 34 are supported section 20 at its lower end and are held in place by a flange 36 which is welded to section 20. A suitable collar 34 is illustrated in FIG. 4. Collar 34 is made in the form of a sleeve and has an inside diameter which is only slightly larger than the outside diameter of riser 20. The upper end of collar 34 is provided with a recess 38 which has a diameter D. A typical dimension for D could be 26 inches for a riser pipe having an outside diameter of 18.625 inches. The lower portion of recess 38 has a spherical type concave surface 40. The upper end of annular section 42 has a spherical convex surface 44. The centers of spherical surface 40 and spherical surface 44 coincide. The lower end of collar 36 is provided with a protrusion 46 which is of a dimension to fit into recess 38. The shape of spherical convex surfaces 48 and 50 on the lower end of the collar complement the shape of spherical surfaces 40 and 44. There are several collars 36 which are spaced one on top of the other and the arrangement of the spherical surfaces permits the section of the pipe 20 over which the collars are positioned to have some curvature. (The outside diameter of the lower end of protrusion 46 is slightly less than the internal diameter D of recess 38.) The vertical dimension of the collar 36 can typically be about 48 inches. For an 18.625-inch riser pipe, the dimension A can be 44 inches; dimension B can be 42 inches, for example. A polymer or other material is placed over the exterior of 36 to prevent corrosion.

Figure 3:
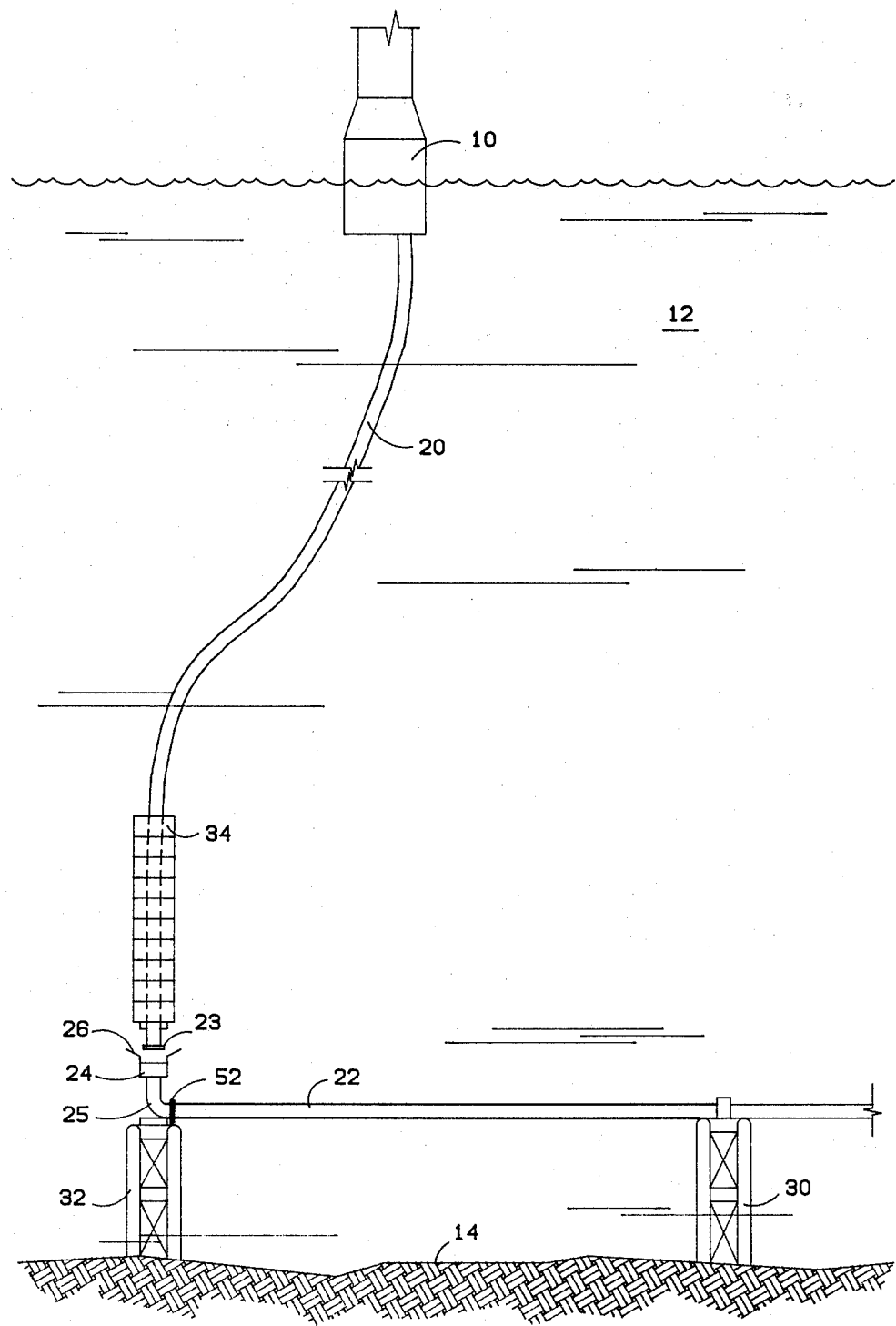
FIG. 3 is similar to FIG. 2 except it illustrates the horizontal section in a tied-down position and not yet connected to the vertical section.

Attention is next directed to FIG. 3 which is similar to FIG. 2 except that the vertical section 20 has not been connected to the lower section 22. Prior to the connection, horizontal section 22 is attached to support frame 32 by a frangible strap 52. The lower end of vertical section 20 is provided with a connector portion 23 which complements connector section 24 which is connected to ell 25 of the horizontal section 22. Typically, the connector 23 has to be forced into connector 24 to effect the connection. This is accomplished by positioning connector 23 above connector 24 partly by use of guide funnels 26 and, if necessary, by other well known means such as divers. Once the connector 23 is in position as shown in FIG. 3, vertical riser pipe section 20 is lowered so that the force of the weights 34 can be used to force section 23 into section 24 of the connector in order to effect the connection as shown in FIG. 2. Once this connection is effected, an upward force is applied from vessel 10 to the riser pipe vertical section 20. This fractures the strap 52. The upper end of riser pipe section 20 is then "tied off" in vessel 10 so that the lower end of the vertical section, as exemplified by point 54, is always above support 32 in normal operations. The horizontal length of horizontal section 22 is such that it can permit the vertical motion of the connector 24 without being overstressed. It can typically be from about 30 to about 100 feet or more in length.

The vertical motion of the connector is equal to the sum of the lengthening of the distance between the vessel 10 and the frame 32 and the shortening of the riser pipe 20 due to its curvature.

Figure 5:
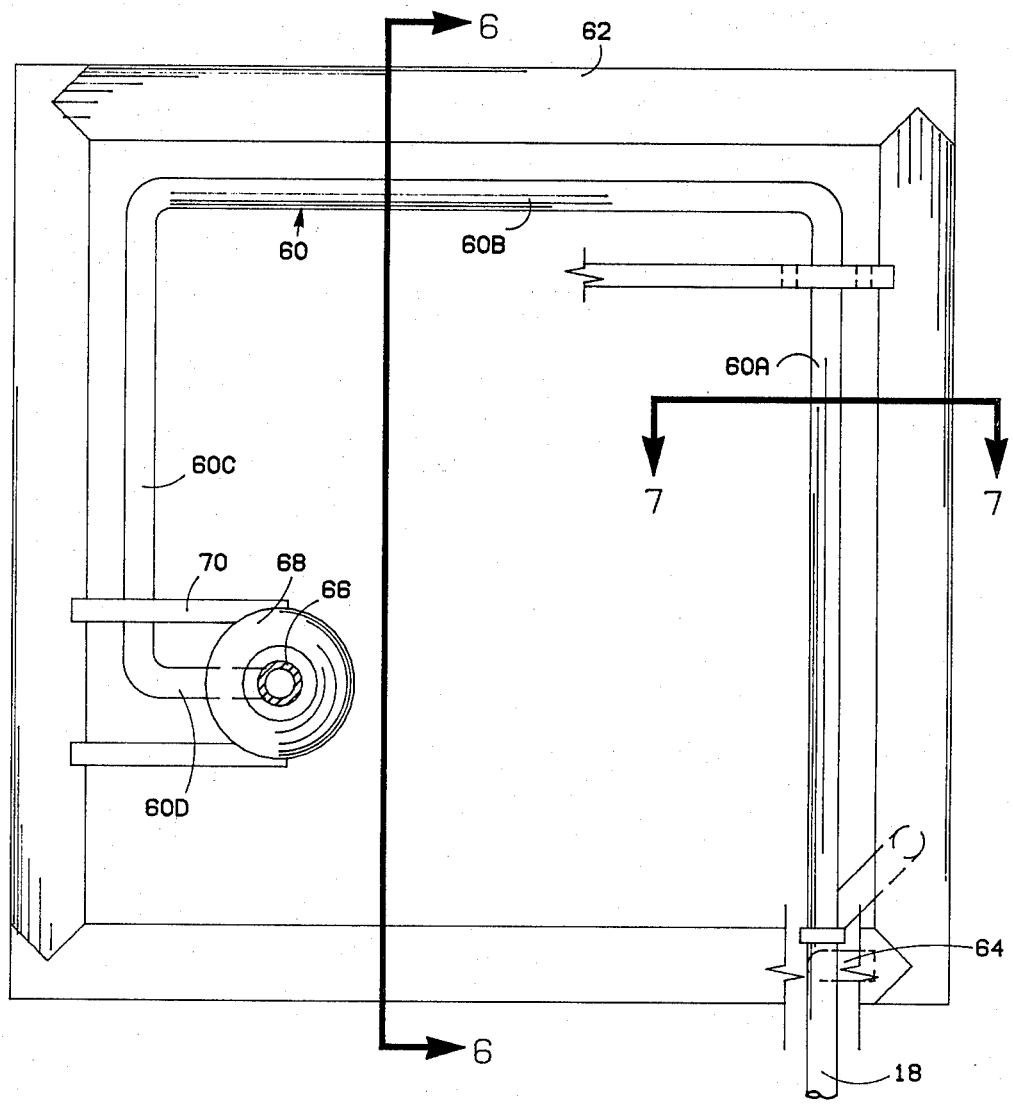
FIG. 5 shows a top view of a preferred arrangement of the horizontal section of the riser pipe conduit.

Attention is next directed to FIG. 5 which shows a preferred configuration of the horizontal portion 22 of the riser pipe 16. The part that corresponds in function to horizontal section 22 of FIG. 1 is indicated by the numeral 60 which is supported inside a template 62. Horizontal section 60 is connected to subsea pipeline 18 and is attached to frame 62 only at point 64. Horizontal section 60 includes three sections, 60A, 60B, and 60C. Section 60C has a short section 60D which connects into an ell having an upwardly extending portion 66. Section 66 extends up through guide funnel 68 which is supported from frame 62 by subframe 70. Portion 66 is not in contact with guide frame 66 during normal operations.

Figure 6:
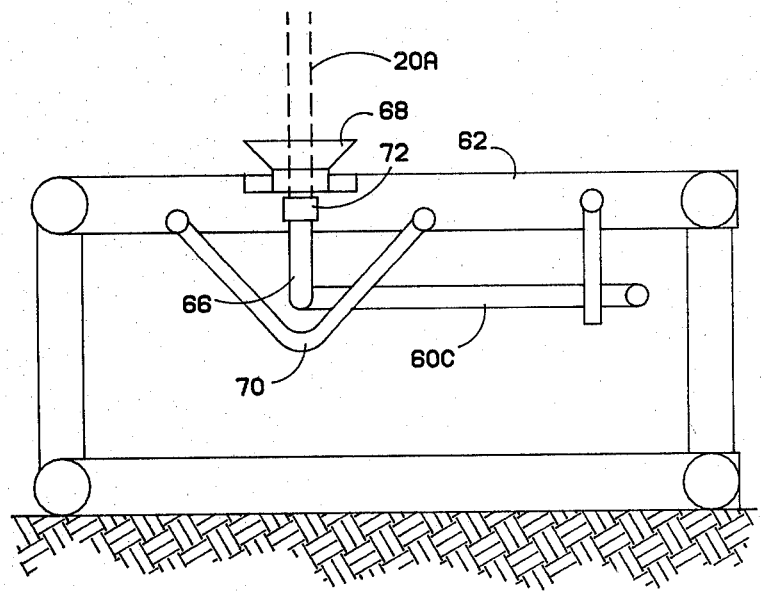
FIG. 6 illustrates a schematic view along the line 6—6 of FIG. 5.

Attention is next directed to FIG. 6 which is taken along the line 6—6 of FIG. 5 and shows a cradle 70 supported from frame 62. Upright member 66 has a connector 72 which can be similar to the connector 24. A lower portion of section 20 is indicated by 20A which is guided into conductor 72. The cradle 70 serves essentially the same function as support 32 of FIGS. 1, 2 and 3. Further, the guide funnel 68 serves the function of preventing excessive lateral movement of section 20A beyond that for which it is designed.

Figure 7:
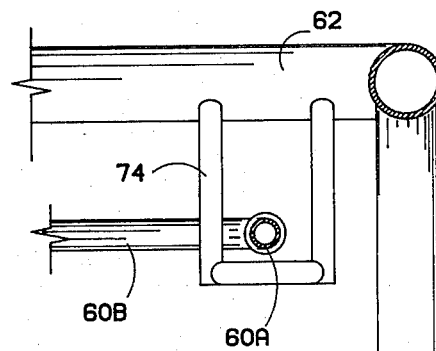
FIG. 7 represents a schematic view along the line 7—7 of FIG. 5.

Attention is next directed to FIG. 7 which shows a schematic along the line 7—7 of FIG. 5 and shows section 60A within restraint frame 74 supported from main frame 62. Again, in normal operations, section 60A is not in contact with restraint frame 74 which is provided only to prohibit excessive flexure of the horizontal pipe 60A.

While the above invention has been described in detail, various modifications can be made thereto without departing from the spirit or scope of the invention.

What is claimed is:

1. An unarticulated riser pipe for connecting a subsea pipeline to a floating structure in a body of water comprising:
   (a) a vertical riser pipe section supported at the upper end by said floating structure;
   (b) a section for providing flexibility including a horizontal pipe section connected at one end to said subsea pipeline and at the other end rigidly connected to said vertical riser pipe section, said horizontal pipe being supported from the bottom of said body of water only near said one end with the other end above said bottom; and
   (c) weight means connected to and supported by the lower end of said vertical riser pipe section so as to apply a downward force to the lower end of said vertical riser pipe section.

2. An unarticulated riser pipe as defined in claim 1 wherein the weight of element (c) are heavy collars placed about and supported from the lower end of said riser pipe section.

3. An unarticulated riser pipe as defined in claim 1 in which said weight means is a weight supported beneath and by said horizontal pipe section near said other end so as to apply downward force on said riser pipe section.

4. An unarticulated riser pipe as defined in claim 1 wherein the upper end of said riser pipe is fixed vertically with respect to said floating structure.

5. A method of installing an unarticulated riser pipe, having a vertical riser pipe section and a flexible section including a horizontal pipe section, from a subsea pipe to a floating structure which comprises:
   (a) connecting one end of said horizontal pipe section to said subsea pipe;
   (b) setting a support means on the ocean floor adjacent the other end of said horizontal pipe section;
   (c) strapping said other end of said horizontal pipe section to said support means;
   (d) providing the lower end of said vertical riser pipe section and said other end of said horizontal pipe section with complementing automatic connecting means;
   (e) connecting the lower end of said vertical riser pipe section to said other end of said horizontal pipe section by applying a downward force through the lower end of said vertical pipe section, such downward force being resisted by said support means;
   (f) after said connection is accomplished, pulling up on said vertical riser pipe section so as to break said strap;
   (g) connecting the weight means to the lower end of said vertical riser pipe section so as to apply downward force to the lower end of said vertical riser pipe section.

6. An unarticulated riser pipe for connecting a subsea pipeline to a floating structure in a body of water comprising:
   (a) a vertical riser pipe section supported at the upper end by said floating structure;
   (b) a section for providing flexibility including a horizontal pipe section connected at one end to said subsea pipeline and at the other end rigidly connected to said vertical riser pipe sections, said horizontal pipe being supported from the bottom of said body of water only near said one end, said horizontal pipe section being at least about 30 feet in length;
   (c) a support structure supported from the floor of the body of water, the other end of said structure being beneath said horizontal pipe section near said other end a sufficient distance so as to contact the same when no tension is applied to the upper end of said vertical riser pipe section but not in contact for operation under a selected design criteria of wave current and load; and (d) weight means connected to the lower end of said vertical riser pipe section so as to apply downward force to the lower end of said vertical riser pipe section.

7. An unarticulated riser pipe for connecting a subsea pipeline to a floating structure in a body of water comprising:
(a) a vertical riser pipe section supported at the upper end by said floating structure;
(b) a section for providing flexibility including a horizontal pipe section connected at one end to said subsea pipeline and at the other end rigidly connected to said vertical riser pipe section, said horizontal pipe being supported from the bottom of said body of water only near said one end, said horizontal pipe section being at least about 30 feet in length, said section including a rectangular frame supported from the floor of said body of water with a portion of said horizontal pipe section having a shape extending along at least a part of two adjacent sides of said frame but not in contact therewith in normal operations for a selected design criteria, and a temporary support carried by said frame and positioned below the lower end of said vertical riser pipe section; and
(c) weight means connected to the lower end of said vertical riser pipe section so as to apply a downward force to the lower end of said vertical riser pipe section.

8. An unarticulated riser pipe as defined in claim 7 including a restraining frame surrounding the lower end of said vertical riser pipe section and supported from said frame to limit horizontal movement of said lower end.

9. A method of providing an unarticulated riser pipe from a structure floating in a body of water to a subsea pipeline which comprises:
(a) supporting the upper end of a vertical riser pipe section from said floating structure,
(b) connecting one end of a horizontal pipe section to a subsea pipeline and rigidly connecting the other end to the lower end of said vertical riser pipe section,
(c) applying a downward force to the lower end of said vertical riser pipe section to maintain said vertical riser pipe section other than that force caused by the weight of the vertical riser pipe and horizontal pipe section under tension.

* * * * *

UNITED STATES PATENT AND TRADEMARK OFFICE
CERTIFICATE OF CORRECTION

PATENT NO. : 4,290,715

DATED : September 22, 1981

INVENTOR(S) : P. A. Beynet, et al.

It is certified that error appears in the above—identified patent and that said Letters Patent is hereby corrected as shown below:

Column 6, Line 22, after "section" insert --other than that force caused by the weight of the vertical riser pipe and horizontal pipe section--; Line 23, after "section" delete through Line 25, "other than that force caused by the weight of the vertical riser pipe and horizontal pipe section".

Signed and Sealed this

Ninth Day of August 1983

[SEAL]

Attest:

Attesting Officer

GERALD J. MOSSINGHOFF

Commissioner of Patents and Trademarks